United States Patent [19]

Richter et al.

[11] 4,363,374
[45] Dec. 14, 1982

[54] TRACTOR

[76] Inventors: Howard J. Richter; Graham J. Richter, both of 2 Church St., Boonah, Australia, 4310

[21] Appl. No.: 196,017

[22] Filed: Oct. 10, 1980

[30] Foreign Application Priority Data

Apr. 6, 1979 [AU] Australia .............................. PD8339

[51] Int. Cl.³ .............................................. B62D 49/00
[52] U.S. Cl. ................................... 180/209; 172/273; 172/667; 180/89.1; 180/900; 280/43
[58] Field of Search ................. 180/89.1, 900, DIG. 2, 180/209; 414/458, 459; 172/311, 316, 272, 273, 274, 507, 667, 742; 280/43

[56] References Cited

U.S. PATENT DOCUMENTS

| 1,374,412 | 4/1921 | Waterman | 180/DIG. 2 |
| 2,366,166 | 1/1945 | Willock | 180/89.1 X |
| 2,706,120 | 4/1955 | Stratton | 414/458 X |
| 2,796,140 | 6/1957 | Knolle | 180/900 X |
| 2,836,430 | 5/1958 | Langenbacher | 280/43 |
| 3,154,164 | 10/1964 | Shaw et al. | 180/DIG. 2 |
| 3,179,194 | 4/1965 | Hunt | 180/900 X |
| 3,306,390 | 2/1967 | Jamme | 180/237 |

FOREIGN PATENT DOCUMENTS

| 1504753 | 10/1967 | France . | |
| 2066012 | 8/1971 | France . | |
| 2329501 | 5/1977 | France . | |
| 537648 | 1/1977 | U.S.S.R. | 414/458 |

Primary Examiner—John A. Pekar
Attorney, Agent, or Firm—Schwartz, Jeffery, Schwaab, Mack, Blumenthal & Koch

[57] ABSTRACT

The tractor has a main frame, supported by a pair of steering/driving wheels, to which is fitted the engine and transmission. A pair of booms are pivotally mounted on the frame (or on a sub-frame pivotally connected to the frame) and are provided with castor wheels. The track between the castor wheels is selectively adjustable by hydraulic rams connected to the booms and the frame (or sub-frame). Agricultural implements may be connected to the frame, to the booms inside the wheelbase of the tractor or to a draw-bar interconnecting the booms.

9 Claims, 2 Drawing Figures

TRACTOR

BACKGROUND OF THE INVENTION (1) Field of the Invention

This invention relates to a tractor self-propelled implement vehicle or the like (hereinafter called "a tractor"). The invention is also directed to a power-module which can be used with such tractors or implements.

(2) Description of the Prior Art

The conventional tractor has been in use in the same general configuration for many years and in principle has been confined to one module incorporating the chassis, engine, transmission and operator's platform, the module being supported on four or more wheels, of which generally 2 or 4 are driven. The evolution of the tractor was based on horse drawn equipment through to the "iron horse" with implements, attachments and harvesters, the tractor taking over the role of the horse(s) as the means of motive power.

While no one will deny that the tractor has been a marked improvement over the horse in terms of productivity, expense, running costs and ease of use, the conventional tractor has limitations in many aspects and some of the more important are listed as follows:

(a) It has only one three-point linkage assembly at the rear.

(b) It requires a headland to turn about, the size of the headland depending on whether the implement is attached to the three-point linkage or to the draw bar.

(c) As the implement is generally trailed, the operator must drive looking forward to steer and rearward to control the operation of the implement.

(d) In certain applications, e.g. harvesting, separate operators are required for the tractor and implement.

(e) It is inefficient at low speeds as the engine speed, and therefore the torque and power output, is low with the possibility of the engine stalling. In addition the output speed of any drive to any implement (e.g. by the power-take-off (P.T.O.)) is not independent of the engine speed.

(f) It has not been possible to offer both high clearance and low clearance facilities on the one tractor.

(g) The extent of variations in the track, e.g. to suit row crops, has been limited, and the wheel-base has been fixed.

(h) It is liable to roll over either under load or when travelling on steep terrain.

(i) The number of attachments which can be fitted in one operation is limited.

(j) It is not adapted for quick disassembly and "walk out" from one implement for fitting to another for a second operation.

(k) It has not been convertable to an independent transporter and cannot provide the facility of a transporter e.g. during harvesting a crop.

(l) It is not readily adaptable to the fitting of implements within its wheelbase.

(m) It is not able to provide a forward speed which is slow enough to suit specific operations, e.g. mushroom compost turning.

(n) It has not been suitable as a mobile workshop with the facility to supply drive to a number of independent pieces of machinery and equipment and is not connectable to both the mechanical and/or hydraulic drive of commercially available equipment without the requirement for auxiliary power being generated by further attachments on the tractor or equipment.

(o) It has not provided an alternative range and power and type of engine for a single tractor.

(p) It has not always offered a high gear ratio for road transport and a low gear ratio for field work.

(q) It has not provided the facility to tip a transporter bin inside the four wheels or to high clear with such a bin.

(r) It has not provided the option of four wheel drive which may be fitted to a standard unit after delivery or for independent drive to the four wheels.

(s) It has not been adaptable to be packed down into a small volume module for transportation.

(t) It has not provided an all-purpose tractor powered by an all-hydrostatic power system.

SUMMARY OF THE INVENTION

It is an object of the present invention which can overcome one or more of the above failings of conventional tractors.

It is a preferred object that a tractor of the present invention is relatively simple to manufacture and operate.

It is a further preferred object of the present invention to provide a suitable power module for the tractor.

Other preferred objects of the present invention will become apparent from the following description.

In one aspect the present invention resides in a tractor including:
a frame;
an engine mounted on the frame;
at least one drive wheel supporting the frame;
transmission means operatively connecting said engine and said drive wheel;
at least one boom pivotally connecting to the frame; and
a ground engaging wheel supporting said boom.

Preferably the frame is rectangular and the booms are pivotally connected to the corners of the frame. Alternatively a sub-frame may be pivotally connected to the frame and the booms pivotally connected to the sub-frame. Preferably the pivotal movement of each boom is controlled by a hydraulic ram. The transmission means may include a hydraulic pump driven by the engine and a pair of hydraulic motors, one in the hub of each drive wheel. Alternatively, the transmission may include a gearbox and differential or other suitable drive means.

The ground engaging wheels on the booms may be castor wheels or may be steered. If required, these wheels may also be provided with hydrostatic motors to provide four wheel drive (4WD).

To enable the track of the tractor to be varied, the booms may be swung in or out and the drive wheels may be mounted on slidably mounted axles. The axle housings may be movable to enable the clearance of the tractor to be raised or lowered.

Tool attachment means, e.g. hitches, brackets, three-point linkage or the like, may be mounted on the frame, sub-frame and/or the booms.

BRIEF DESCRIPTION OF THE SEVERAL VIEWS OF THE DRAWINGS

To enable the invention to be fully understood, a preferred embodiment will now be described with reference to the accompanying drawings, in which.

DETAILED DESCRIPTION OF THE PREFERRED EMBODIMENT

Figure 1:
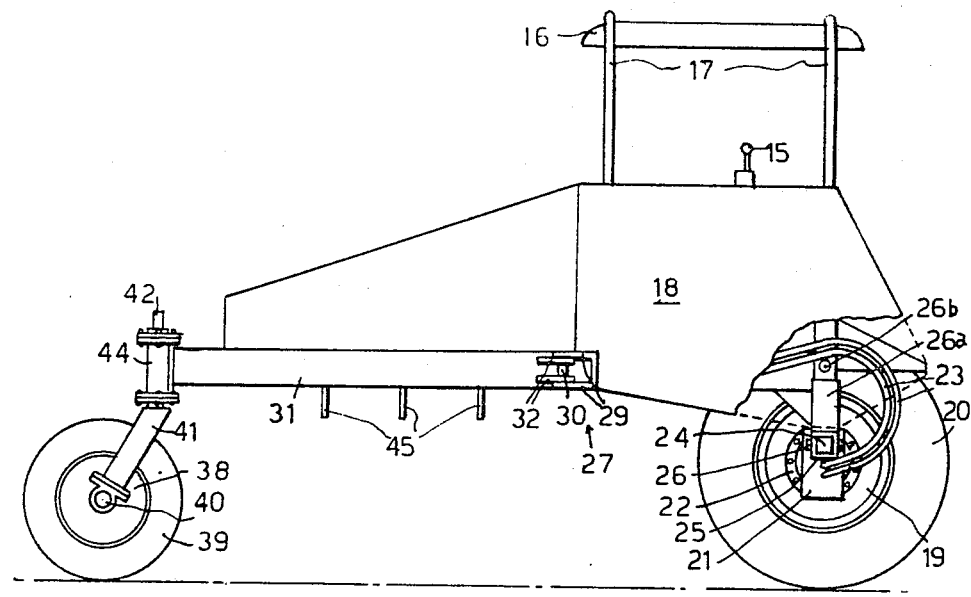
FIG. 1 is a side of the tractor, with a portion broken away for clarity.

The power module 10 of the tractor has a peripheral frame 11. A petrol or diesel engine driving a hydraulic pump is mounted inside the engine cover 12. A fuel tank and hydraulic oil tank is also mounted on the frame (not shown). An operator's seat 13 is mounted at one side of the operator's platform 14 and the operator is provided with operating controls 15. A canopy 16, supported on posts 17, and side covers 18 are provided to protect the operator on the platform 14.

Each drive wheel 19, fitted with a pneumatic tire 20, has a hydraulic motor 21 connected to its hub 22 in driving arrangement. The motors 21 are connected to the hydraulic pump via hydraulic lines 23. The supply of fluid from the pump to each motor 21 is controlled by the operator via control levers 15. Each motor 21 is mounted on one end of a stub axle 24 which is slidably mounted in a box-section axle housing 25. Holes (not shown) are provided in each stub axle 24 and its respective axle housing 25 and bolts 26 are provided to secure the axles at a desired track setting. As shown in the FIGS. the drive wheels 19 lie inside the frame 11 of the power module. The track can be further reduced by moving the wheels towards each other. To increase the track, the stub axles 24 are reversed so that the wheels 19 lie outside the frame 11. To facilitate this adjustment, quick-disconnect couplings are provided between the motors 21 and hydraulic lines 23.

To enable the clearance of the tractor to be raised and lowered, each axle housing 25 is mounted on axle arm 26a, pivotally mounted on frame 11 via a pivot pin 26b and held in position by bolts (not shown). As shown in FIG. 1, the tractor is in the high clearance mode.

A sub-frame 27 extends transversely of the tractor and is pivotally connected to the frame 11 via a pivot pin 28. Limit stops (not shown) control the relative angular movement between the frame 11 and sub-frame 27.

The sub-frame 27 is terminated by a pair of L-shaped brackets 29 at each end, the brackets 29 being spaced apart and interconnected by a pivot pin 30.

Figure 2:
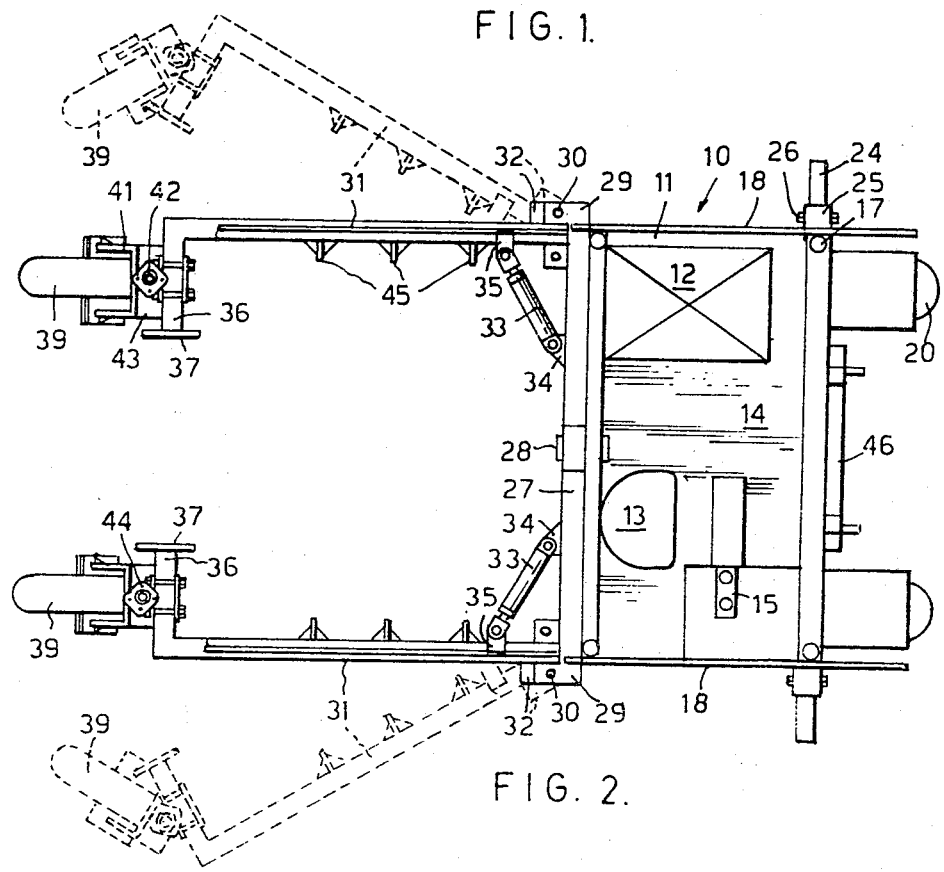
FIG. 2 is a plan view of the tractor showing the booms swung in (solid lines) and swung out (dashed lines).

A boom 31, having lateral flanges 32 at one end, is pivotally mounted on each pivot pin 30 and is pivotally movable between the positions shown in FIG. 2. The pivotal movement of each boom 31 is controlled by a hydraulic ram 33 pivotally mounted on brackets 34, 35 on the sub-frame 27 and boom 31 respectively. The operation of the hydraulic rams 33 is controlled by the operator.

A lateral beam 36 extends inwardly from the other end of each boom 31 and is terminated by a plate 37. If required, a beam (not shown) may be provided to be connected to the plates 37 when the booms 31 are swung inwardly (full lines)-this beam can be provided, for example, with a hitch or a three-point linkage. A castor wheel 38, having a pneumatic tire 39, is mounted on an axle 40 carried by parallel arms 41. An axle 42 fixed on plate 43 connecting the arms 41 is journalled in a bearing 44 mounted on each lateral beam 36.

A plurality of implement attachment brackets 45 are fixed along each boom 31 and a tool mounting bar 46 is mounted on the frame 11 between the driving wheels 19.

The operation of the tractor will now be described.

The engine drives the hydraulic pump which in turn drives the two hydraulic motors 21, and thereby drive wheels 19. By operation of the control levers 15, the operator can control the flow of hydraulic fluid to each motor 21. To turn the tractor, e.g. left, the operator moves the control lever 15 to restrict the flow of hydraulic fluid to the left hand drive motor. The left hand drive wheel slows or stops and the tractor turns to the left, the axles 42 of the castor wheels 38 rotating in their respective bearings 44.

In normal operation, the booms 31 are swung inwardly as shown in solid lines in FIG. 2. To secure an implement between the booms via attachment brackets 45, the operator extends hydraulic rams 33 to swing the booms outwardly (as shown in dashed lines). He then reverses the tractor until the implement is straddled by the tractor. He swings the booms inwardly and connects the implement to the brackets 45.

For row crop work, or where additional stability is required, the operator may swing the booms outwardly to a desired track setting.

To obtain the desired track setting for the drive wheels 19, he slides the stub axles 24 in axle housings 25 until the desired setting is obtained, and locks the stub axles in position via bolts 26.

Alternatively, or in addition, where a greater track setting is required, the stub axles 24 are removed from their housings 25 inserted from outside the frame (so that the drive wheels lie outside frame 11).

For reduced ground clearance, the axle arms 26a are pivoted about pivot pins 26b until the desired ground clearance is achieved.

In rough terrain, any twisting forces on the tractor are at least partly compensated for by the pivotal movement between the frame 11 and sub-frame 27. (It will be appreciated that in many applications, this pivotal movement will not be required and so the sub-frame may be deleted and the booms mounted directly onto the frame 11).

With the present arrangement, one or more implements can be mounted between the booms, on tool mounting bar 46 or on the beam (not shown) interconnecting the plates 37. This ensures the tractor is extremely versatile and has the major advantage that one or more implements can be mounted within the wheel base of the tractor, a factor which is difficult or almost impossible with most known tractors.

Where a hydrostatic drive arrangement as previously described is employed, the tractor can be used with the castor wheels 38 either leading or trailing, depending on which direction of travel is most advantageous.

In addition, the operator's platform can be mounted, e.g. on an extensible boom on the frame 11 so that the operator can be positioned over the implement or to one side (such as when picking fruit from trees).

Various changes and modifications may be made to the arrangements described without departing from the scope of the present invention. It will be understood, for example, that a track assembly or a pair of such assemblies may be used in substitution for the drive wheels 19 of the power module 10. The castor wheels 38 may be replaced by steerable and driven wheels or track assemblies in a four wheel drive (4WD) configuration. The terms "drive wheel" and "ground engaging wheel"

used herein shall be taken to include "drive tracks" and "ground engaging tracks".

We claim:

1. A tractor including:
   (a) a frame;
   (b) an engine mounted on said frame;
   (c) at least one drive wheel supporting said frame;
   (d) transmission means operatively connecting said engine and said drive wheel;
   (e) at least one boom pivotally connected to said frame and extending in a direction away from said frame;
   (f) means for pivotally moving said boom toward or away from the longitudinal axis of said frame;
   (g) means on said boom to permit a farming implement to be secured thereto; and
   (h) a ground engaging wheel supporting said boom.

2. A tractor as claimed in claim 1 wherein said frame is substantially rectangular; and
   a pair of booms are pivotally connected to adjacent corners of the frame.

3. A tractor as claimed in claim 1 further including a sub-frame pivotally connected to said frame for relative angular movement; and
   a pair of booms pivotally connected to the subframe.

4. A tractor as claimed in claims 2 or 3 further including hydraulic ram means for pivotally moving said booms.

5. A tractor as claimed in claim 1 wherein said transmission means comprises:
   a hydraulic motor operatively connected to said drive wheel;
   a hydraulic pump driven by the engine;
   means to connect said hydraulic motor and said hydraulic pump; and
   control means to control the flow of hydraulic fluid from said hydraulic pump to said hydraulic motor to thereby control the drive to said motor.

6. A tractor as claimed in claim 1 further including:
   an axle housing mounted on each side of said frame;
   a stub axle slidably mounted in each axle housing and movable to vary the track of the tractor, each stub axle having a drive wheel rotatably mounted thereon.

7. A tractor as claimed in claim 6 and further including an axle arm pivotally mounted on each side of said frame, each of said axle housings being mounted on a respective axle arm, pivotal movement of said axle arms raising and lowering said frame relative to the ground.

8. A tractor as claimed in claim 1 in which said ground engaging wheel is a castor wheel.

9. A tractor as claimed in claim 1 in which said ground engaging wheel is driven and steerable.

* * * * *